Patented Oct. 31, 1950

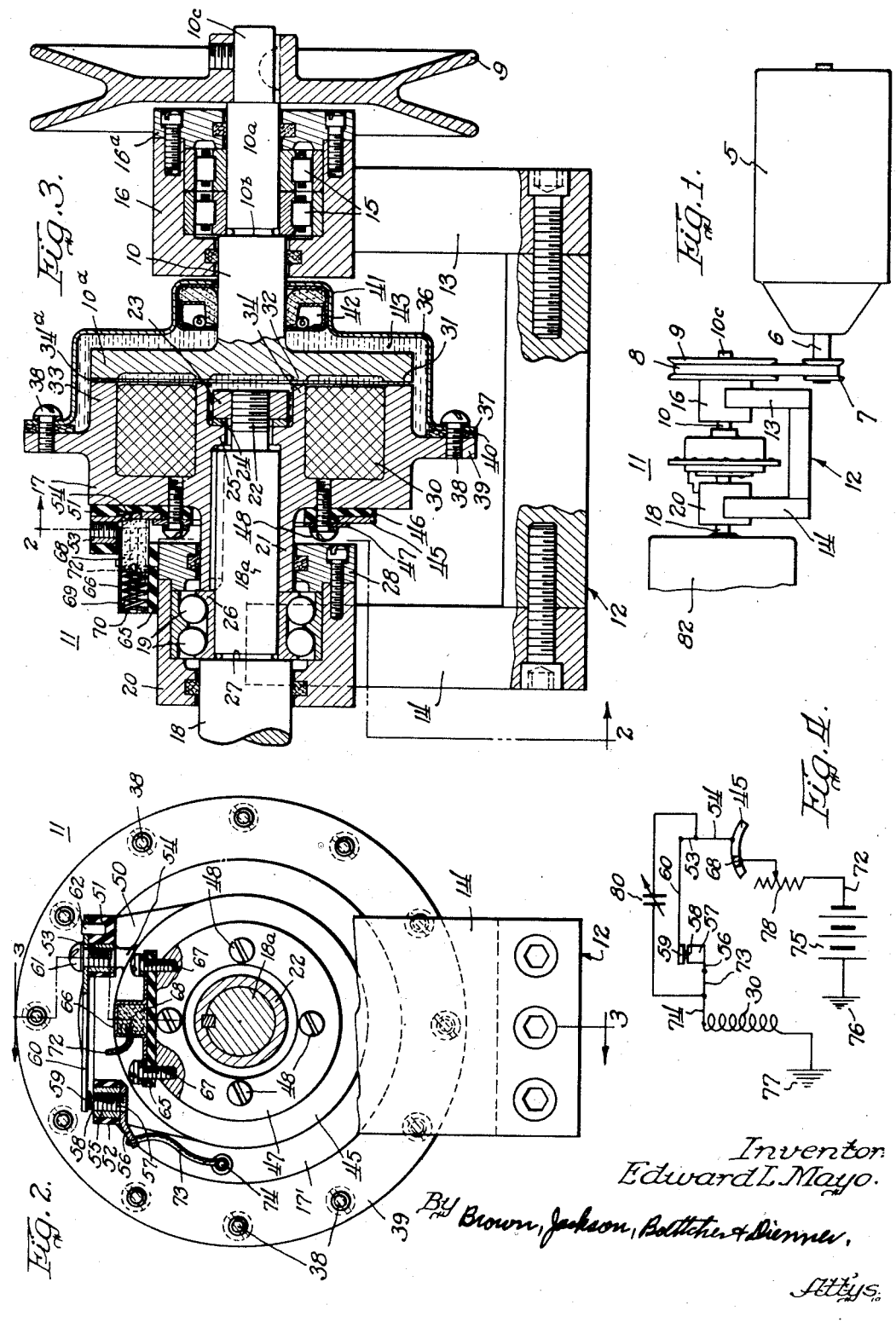

2,528,316

UNITED STATES PATENT OFFICE 2,528,316

ELECTROMAGNETIC COUPLING TRANSMISSION

Edward L. Mayo, Cleveland, Ohio, assignor to The Bishop & Babcock Manufacturing Company, Cleveland, Ohio, a corporation of Ohio Application October 31, 1946, Serial No. 706,859

1 Claim. (Cl. 192—84)

This invention relates to transmissions, and has to do with transmissions employing an electric coupling for establishing driving connection between a drive member and a driven member.

It is known to provide electric couplings for establishing driving connection between two members, one of which is the drive member, the other being the driven member. The known electric couplings are, in general, of rather complicated construction, subject to excessive wear, and impose objectionable stresses on parts of the coupling structure, when the coupling members are held out of direct contact, when the associated energizing coil is energized for effecting the coupling between said members.

My invention is directed to an electric coupling of simple construction and operation which avoids the objections mentioned with respect to the known electric couplings. It is often desirable to drive a part or mechanism at a substantially constant speed, or at a speed which does not exceed a predetermined maximum, and my invention is directed to an electric coupling and automatic control means therefor, whereby that may be effected by simple and highly efficient control means constituting part of the transmission incorporating the electric coupling. More specifically, I provide coaxial drive and driven shafts having cooperating magnetic coupling members at their adjacent ends, said coupling members having relative movement toward and away from each other, and being normally spaced apart, there being an energizing coil associated with one of the coupling members, the circuit of which coil is controlled by normally closed switch means responsive to rotation of the driven member for opening the circuit of the coil and thereby effecting uncoupling of the two coupling members, when the driven shaft tends to exceed a predetermined maximum speed. In order to assure maximum coupling between the coupling members, when the coil is energized, while avoiding objectionable wear thereof, and noise, in certain cases, I provide means whereby a film of lubricant, such as oil, is formed between the opposed faces of the coupling members effective to prevent direct contact therebetween. Movement of the coupling members together is limited by the coupling members themselves, thereby avoiding imposing objectionable stresses on parts of the transmission, such as accurs where movement of one of the coupling members towards the other is limited by part of the structure of the transmission other than the coupling members themselves. Further objects and advantages of my invention will appear from the detail description.

In the drawings:

Figure 1 is a semi-diagrammatic side view of an electric coupling transmission embodying my invention as used for driving, from a variable speed motor, a mechanism which it is desired to drive at constant speed, or at a speed not exceeding a predetermined maximum;

Figure 2 is a sectional view taken substantially on line 2—2 of Figure 3, certain parts being shown in elevation and certain other parts being broken away;

Figure 3 is a lengthwise, vertical, sectional view, on an enlarged scale, of the electric coupling transmission of Figure 1, taken substantially on line 3—3 of Figure 2, certain parts being shown in elevation and certain other parts being broken away; and Figure 4 is a circuit diagram of the electric coupling, including certain modifications.

In Figure 1 I have shown a suitable power source 5, which may be a variable speed internal combustion engine, such as an automobile engine, or any other suitable variable speed motor or prime mover. Shaft 6 of engine 5 has secured thereon a V pulley 7 receiving a V belt 8 passing about a pulley 9 keyed on drive shaft 10 of an electric coupling transmission 11 embodying my invention. Within the broader aspects of my invention, the shaft 10 may be a shaft of the prime mover itself, or may be driven in any suitable manner, it being understood said shaft then is driven at variable speed which at times exceeds the desired maximum speed of the driven shaft, to be referred to presently, of the transmission, the minimum speed of shaft 10 normally being at least equal to the desired speed of the driven shaft of the transmission.

The transmission 11 comprises a suitable frame 12, conveniently of U form, having upwardly extending arms 13 and 14. The drive shaft 10 is rotatably mounted by suitable anti-friction bearings 15 in a journal box 16 at the upper end of arm 13, this box 16 normally being closed by a cover plate 16a bolted thereto. The outer portion 10a of shaft 10 is of reduced diameter, providing a shoulder 10b which cooperates with the inner one of the bearings 15 to restrain shaft 10 against outward movement, it being noted that the inner races of the bearings 15 are held against movement lengthwise of shaft 10 between the inner end wall of box 16 and the cover plate 16a. The pulley 9 is keyed on the reduced outer terminal element 10c of shaft 10 and normally is spaced outward a short distance from cover plate 16a, as shown. When pulley 9 is in its outer position just referred to, it is accurately aligned with pulley 7 on shaft 6 of motor 5, belt 8 normally tending to hold pulley 9 in that position and urging it thereto when the drive shaft 10 is moved inward. In that connection, it will be clear from what has been said that the shaft 10 is mounted for sliding movement through the bearings 15 and can move inward a short distance from its position shown in Figure 3.

The drive shaft 10 is provided with a magnetic coupling disk 10a fixed to its inner end. Disk 10a cooperates with a magnetic coupling member 17, of cup shape, fixed on the reduced inner end portion 18a of a driven shaft 18 coaxial with drive shaft 10. Shaft 18 is rotatably mounted, by ball bearings 19, in a journal box 20 at the upper end of arm 14 of frame 12. The coupling member 17 comprises a central hub 21 which fits on and is keyed to portion 18a of shaft 18, this shaft having at its inner end a reduced threaded stud 22 on the inner end of which is screwed a securing nut 23. This nut contacts the inner face of a washer 24 seating on the inner face of an interior flange 25 of hub 21. At its outer end hub 21 abuts inner race 26 of the ball bearing 19, which inner race 26 is held between the outer end of hub 21 and shoulder 27 of shaft 18, the outer race of bearing 19 being held between the outer end wall of journal box 20 and a cap plate 28 bolted to the inner end of box 20. It will be clear, from what has been said, that the coupling member 17 is fixed to driven shaft 18 and that this shaft and the coupling member 17 are restrained against movement in either direction lengthwise of shaft 18.

An energizing coil 30 is mounted within the coupling member 17. The circuit of coil 30 is controlled by speed responsive means, as will be explained more fully presently. The disk 10a is provided, at its inner face, with annular elements 31 and 32 aligned with flanges 33 and 34, respectively, of coupling member 17 and hub 21 thereof. The element 31 is a pole element and is disposed for cooperation with flange 33, in contact therewith, when the coil 30 is energized. The annular element 32 may be omitted. When present, it may also function as a pole element cooperating with flange 34, in contact with the latter, though in many cases that is not necessary. Normally, disk 10a is held spaced away from member 17, as previously described, to provide an air gap 34a therebetween effective to prevent drag of the coupling member 17 by the disk 10a, due to residual magnetism, when the coil 30 is de-energized. It will be clear, from what has been said, that when the coil 30 is energized the disk 10a is moved toward the coupling member 17 until its movement in that direction is limited thereby, assuring close coupling between the two members. The annular pole element 31 will then be in metal to metal contact with flange 33 of coupling member 17. Also, at that time, the annular element 32, if present, may cooperate as a pole element with flange 34 though, as noted, that is not necessary in many cases. While the coupling members 10a and 17 preferably are formed as shown and described, my invention comprehends coupling members of any suitable form and extent to effect the desired coupling, when coil 30 is energized.

In some cases it may be desirable to immerse the coupling members in oil, with a view to reducing wear and objectionable noise. In the illustrated embodiment of my invention, a housing member 36, of generally cup shape, conveniently formed of sheet metal, is disposed about disk 10a and the adjacent portion of member 17. Housing 36 is provided, at one end thereof, with an outwardly extending circumferential flange 37 suitably secured, conveniently by means of screws 38, to an outwardly extending circumferential flange 39 of member 17, with an intervening sealing gasket 40. At its other end, the housing 36 is provided with an outwardly extending cupped element 41, in which is disposed an oil seal 42 of known type extending about drive shaft 10 and providing an oil tight closure thereabout. The housing 36 is filled with oil 43, or other suitable lubricant, providing a bath of oil which extends about disk 10a and the adjacent portion of coupling member 17. The relative movement of the members 10a and 17 toward each other is limited by such members themselves, so that no stresses are imposed on the transmission incident to operation of the coupling, other than the compressive stresses to which the coupling members themselves are subjected and which they are well able to withstand.

A copper slip ring 45 is mounted on an insulating member 46, of annular shape in major portion, suitably recessed for reception of ring 45. A clamp ring 47 secures ring 45 in position on member 46, these parts being secured together, and to the outer end of coupling member 17, in a suitable manner, conveniently by means of screws 48 passing through the parts and threading into the outer end wall of member 17. The mounting member 46 is provided with an upward extension 50 having two outwardly projecting lugs 51 and 52, disposed above journal box 20 and on opposite sides of the axis of driven shaft 18. An interiorly threaded copper ferrule 53 is suitably secured in lug 51, conveniently by molding this lug about ferrule 53 in a known manner. Ferrule 53 is provided with a downwardly extending connector element 54 which is suitably secured, conveniently by welding, to the slip ring 45. The lug 52 also has secured therein a copper ferrule 55, to the lower end of which is secured, conveniently by welding, a connector boss or tab 56. The ferrule 55 and the tab 56 are suitably bored and tapped for reception of a threaded contact member 57 provided at its upper end with a reduced contact point 58. This point 58 cooperates with a contact button 59 carried by a leaf spring 60 secured at its other end, by a headed screw 61, to ferrule 53. A pin 62, anchored in lug 51 and extending through a corresponding opening in spring 60, adjacent screw 61, restrains spring 60 against turning movement about screw 61. Normally, spring 60 holds button 59 against contact point 58 of member 57, and in the rotation of coupling member 17, spring 60 is urged outward tending to move button 59 out of contact with point 58. It will be seen that the spring 60 and associated parts thus provide a vibratory centrifugal switch which will open when the speed of rotation of driven shaft 18 exceeds, or tends to exceed, a desired predetermined maximum and will close when the speed of shaft 18 is reduced to that predetermined maximum.

The upper portion of journal box 20 is slabbed off, so as to provide a flattened surface on which seats a strip 65 of electrical insulating material and of appropriate thickness. A flanged brush tube 66, formed of brass or other suitable metal, is secured on strip 65, conveniently by screws 67 suitably insulated from the flanges of tube 66 and passing through such flanges and through strip 65, these screws threading into the journal box 20 and securing the assembly together and to the journal box, as will be clear. A spring pressed carbon brush 68 is slidably mounted in tube 66 and is yieldingly urged, by a compression spring 69, confined between brush 68 and tabs 70 struck from sleeve 66, into contact with slip ring 45. A lead 72, connected to one side of a suitable source of electrical energy, is attached to brush 68. A lead 73 is secured to connector tab 56 and to a short supplementary lead 74 passing through the outer end wall of member 17, from which it is electrically insulated, and is connected to one end of the energizing coil 30. The other end of the coil 30 is grounded, as is the other side of the source of electrical energy to which lead 72 is connected.

Referring to Figure 4, I have shown, by way of illustration, a storage battery 75 as the source of electrical energy, it being understood, however, that any suitable source of electrical energy may be provided. The lead 72 is connected to one side of battery 75, the other side of which is grounded at 76. As indicated, the other end of energizing coil 30 is grounded at 77. If desired, lead 72 may include an adjustable resistance or rheostat 78, and a condenser 80, adjustable, or otherwise as desired, may be connected in shunt with the switch comprising leaf spring 60 and associated parts, the condenser 80 being shown as a variable condenser. The rheostat 78 provides convenient means whereby the effective magnetic field of the coil 30 may be varied to suit conditions, and the condenser 80 may be desirable, in certain cases, for preventing objectionable sparking between the contact elements of the switch. As will be understood, the provision of the rheostat and of the condenser is optional and may be omitted in certain cases, where not required.

The driven shaft 18 of the transmission may be used to drive, either directly or indirectly, any suitable device or mechanism which it is desired to drive at a speed not exceeding a predetermined maximum, preferably at a substantially constant speed. In Figure 1 I have indicated a mechanism 82 connected to shaft 18 so as to be driven thereby. The mechanism 82 may be, for example, a compressor for a refrigeration system, which compressor it is desired to drive at a speed not exceeding a predetermined maximum, preferably at a substantially constant speed. In the diagrammatic illustration of Figure 1, the prime mover or motor 5 operates at variable speed, having under normal conditions a minimum speed at least equal to the desired maximum speed of shaft 18, and at times having a speed in excess of such desired speed. It will be seen that when the prime mover 5 is in operation and the coil 30 is energized, the disc 10a will be coupled to member 17. So long as the shaft 18 is driven at the desired speed, spring 60 maintains contact button 59 in contact with point 58, as will be understood. When the speed of rotation of shaft 18 tends to exceed the desired speed thereof, contact button 59 is thrown outward by centrifugal force so as to be moved out of contact with point 58, thus opening the circuit of coil 30 so as to deenergize the latter and momentarily disable the coupling between the two members 10a and 17. When that occurs, the speed of rotation of shaft 18 immediately drops to the desired value, and the spring 60 again moves contact button 59 into contact with the point 58, again energizing the coil 30. In that manner, the spring 60 and associated parts provide a vibratory centrifugal switch urged in opening direction by rotation of shaft 18, this switch being closed so long as the speed of rotation of shaft 18 does not exceed the desired maximum. It will be clear that when the coil 30 is energized and the prime mover 5 is in operation, shaft 18 and the compressor or other mechanism 82 driven thereby are operated at substantially constant speed, and the speed of rotation of shaft 18 is prevented from exceeding the desired or permissible maximum speed therefor.

As will be understood from the above, changes in details of construction and arrangement of parts of my invention may be resorted to without departing from the field and scope thereof, and I intend to include all such variations, as fall within the scope of the appended claim, in this application in which the preferred form only of my invention has been disclosed.

I claim:

In electromagnetic coupling transmission means, a driven shaft and a coaxial drive shaft, cooperating magnetic coupling members on said shafts, an energizing coil carried by the driven shaft coupling member, a source of electrical energy, and means controlling connection of said coil to said source of electrical energy comprising a slip ring and a speed responsive switch carried by said driven shaft coupling member and connected in series circuit relation with each other and with said coil and source of electrical energy, said switch comprising a resilient contact arm of material length fixed at one end to said driven coupling member, said arm being spaced outwardly from and extending transversely of said shafts and free at its other end for outward movement.

EDWARD L. MAYO.

REFERENCES CITED

The following references are of record in the file of this patent:

UNITED STATES PATENTS

| Number | Name | Date |
| --- | --- | --- |
| 1,018,476 | Bostater | Feb. 27, 1912 |
| 1,201,856 | Murdock | Oct. 17, 1916 |
| 1,569,651 | Costello | Jan. 12, 1926 |
| 1,756,907 | Payne | Apr. 29, 1930 |
| 1,868,910 | Miller | July 26, 1932 |
| 1,902,471 | Thomson | Mar. 21, 1933 |
| 1,973,199 | Conway | Sept. 11, 1934 |
| 2,214,391 | Weydell | Sept. 10, 1940 |
| 2,214,901 | Griffin | Sept. 17, 1940 |
| 2,280,736 | Winther | Apr. 21, 1942 |
| 2,281,711 | Peck et al. | May 5, 1942 |
| 2,442,456 | Boyden et al. | June 1, 1948 |

FOREIGN PATENTS

| Number | Country | Date |
| --- | --- | --- |
| 394,869 | France | Feb. 4, 1909 |